United States Patent
Brunner

(10) Patent No.: US 8,494,357 B2
(45) Date of Patent: *Jul. 23, 2013

(54) DYNAMIC EXPOSURE METERING BASED ON FACE DETECTION

(75) Inventor: Ralph Brunner, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/534,749

(22) Filed: Jun. 27, 2012

(65) Prior Publication Data

US 2012/0262599 A1 Oct. 18, 2012

Related U.S. Application Data

(63) Continuation of application No. 12/755,542, filed on Apr. 7, 2010, now Pat. No. 8,233,789.

(51) Int. Cl.
*G03B 7/00* (2006.01)
*G03B 3/10* (2006.01)
*G03B 13/34* (2006.01)
*H04N 5/235* (2006.01)

(52) U.S. Cl.
USPC ........... 396/213; 396/122; 396/123; 396/233; 348/350; 348/362

(58) Field of Classification Search
USPC .. 396/213, 121–123, 233, 234, 236; 348/345, 348/350, 362
See application file for complete search history.

(56) References Cited

U.S. PATENT DOCUMENTS

| | | | |
|---|---|---|---|
| 7,020,337 B2 | 3/2006 | Viola et al. | |
| 7,031,499 B2 | 4/2006 | Viola et al. | |
| 7,099,510 B2 | 8/2006 | Jones et al. | |
| 7,197,186 B2 | 3/2007 | Jones et al. | |
| 8,233,789 B2* | 7/2012 | Brunner | 396/213 |
| 2003/0071908 A1 | 4/2003 | Sannoh et al. | |
| 2007/0196097 A1 | 8/2007 | Sugimoto | |
| 2008/0122939 A1 | 5/2008 | Hirai | |
| 2009/0322897 A1 | 12/2009 | Park | |
| 2010/0002093 A1 | 1/2010 | Arai et al. | |
| 2010/0020194 A1 | 1/2010 | Hirooka | |
| 2010/0039535 A1 | 2/2010 | Maeda | |

OTHER PUBLICATIONS

Jin, et al., "Face detection assisted auto exposure: supporting evidence from a psychophysical study", SPIE-IS&T, vol. 7537, pp. 1-12 (2010).
Schneiderman, et al., "A Statistical Method for 3D Object Detection Applied to Faces and Cars", IEEE Conference on Computer Vision and Pattern Recognition (CVPR 2000).
Viola, et al., "Robust Real-Time Face Detection", International Journal of Computer Vision 57(2), pp. 137-154 (May 2004).
Rowley, et al., "Neural Network-Based Face Detection", IEEE Transactions on Pattern Analysis and Machine Intelligence, 20(1), pp. 23-38 (Jan. 1998).

* cited by examiner

*Primary Examiner* — Rochelle-Ann J Blackman
(74) *Attorney, Agent, or Firm* — Wong, Cabello, Lutsch, Rutherford & Brucculeri LLP

(57) ABSTRACT

A system, computer readable medium, and method for dynamically setting a camera's exposure parameters based on face detection are disclosed. When taking a picture or video of a person in front of a bright background, standard exposure algorithms tend to overexpose the background. In one embodiment disclosed herein, a face detection algorithm is run on the current picture or video frame, and the exposure metering region is inset over the detected face. Exposure time, gain, or other exposure parameters may be set based on the pixels within the exposure metering region. In another embodiment, the exposure metering region tracks a moving face according to lag parameters so that the exposure metering region remains substantially over the face. In yet another embodiment, a plurality of faces may be tracked, with the exposure parameters set based on a weighted average of the pixels within the plurality of face-containing exposure metering regions.

20 Claims, 14 Drawing Sheets

DYNAMIC EXPOSURE METERING BASED ON FACE DETECTION

CROSS-REFERENCE TO RELATED APPLICATIONS

This application is a continuation of, and claims priority to, U.S. patent application Ser. No. 12/755,542, which application is hereby incorporated by reference in its entirety.

BACKGROUND

Today, many personal electronic devices come equipped with digital cameras. Often, these devices perform many functions, and, as a consequence, the digital image sensors included in these devices must often be smaller than sensors in conventional cameras. Further, the camera hardware in these devices often lacks sophisticated features sometimes found in larger, professional-style conventional cameras such as manual exposure controls and manual focus. Thus, it is important that digital cameras in personal electronic devices be able to produce the most visually appealing images in a wide variety of lighting and scene situations with limited or no interaction from the user, as well as in the most computationally and cost effective manner.

One feature that has been implemented in some digital cameras to create visually appealing images is known as auto exposure. Auto exposure can be defined generally as any algorithm that automatically calculates and/or manipulates certain camera exposure parameters, e.g., exposure time, gain, or f-number, in such a way that the currently exposed scene is captured in a desirable manner. For example, there may be a predetermined optimum brightness value for a given scene that the camera will try to achieve by adjusting the camera's exposure value. Exposure value (EV) can be defined generally as: $\log_2 N^2/t$, wherein N is the relative aperture (f-number), and t is the exposure time (i.e., "shutter speed") expressed in seconds. Some auto exposure algorithms calculate and/or manipulate the exposure parameters such that a mean, center-weighted mean, median, or more complicated weighted value (as in matrix-metering) of the image's brightness will equal a predetermined optimum brightness value in the resultant, auto exposed scene.

Auto exposure algorithms may also be aided by face detection technologies. In these auto exposure algorithms, the camera will attempt to locate one or more human faces within the scene and tailor its exposure and/or focus parameters to the location of the face or faces in the scene. Such algorithms account for the fact that a good assumption in most consumer photography is that human faces are often the desired subject in an image and, thus, focusing on and exposing properly such faces will often lead to visually pleasing images.

Auto exposure algorithms would also benefit from intelligently and continuously, i.e., dynamically, adjusting exposure parameters in response to changes in the scene being displayed, e.g., on the camera's preview screen. Often, the face detection, auto focusing, and/or auto exposure decisions made by the camera are "locked in" at some point in time before the image is taken. In some cameras, this is done via a user-actuated mechanism, e.g., pressing the shutter button halfway down to lock in the focus and exposure parameters, and then depressing the shutter button fully to take the image according to the locked-in focus and exposure parameters. In other cameras, parameters are set based on the previously taken image. This sort of static lock-in of exposure parameters can make it difficult to tell if a scene will be properly exposed or is being properly exposed in situations where the objects in the scene are moving or the lighting level of the scene is changing. Further, auto exposed video recording applications are not possible with a static face detection-assisted auto exposure algorithm.

Thus, there is need for a system, computer readable medium, and method for intelligently and dynamically setting a camera's exposure parameters in a visually pleasing way based at least in part on face detection.

SUMMARY

When taking a photo or video of a person who is in front of a bright background, standard auto exposure algorithms tend to overexpose the background, leaving the person's face too dark and creating visually unpleasing photos. This is partially a consequence of the fact that a camera's image sensor is unaware what parts of the image are considered the most important to the person taking the photo. Thus, it is often more beneficial for an auto exposure algorithm to base the setting of exposure parameters on the portions of photo containing the desired subject or subjects in the scene—usually a human face or faces.

Current face detection-assisted auto exposure algorithms may work by "locking in" a photo frame upon which to base the exposure parameters for the photo that it is about to be taken or simply using the exposure parameters from a previously taken frame. For example, an algorithm might give particular weights to the brightness values of the face portion and non-face portion of the locked in or previous frame to calculate a weighted average that will serve as an optimum target brightness value for the photo that is about to be taken. Then, when the photo is taken, the exposure parameters of the camera can be set such that scene has close to the optimum target brightness value, and thus is captured in a visually pleasing way, i.e., with an emphasis on exposing human faces correctly.

However, such face detection-assisted auto exposure algorithms do not intelligently and continuously, i.e., dynamically, adjust the exposure parameters in response to changes in the scene being displayed on the camera's preview screen. Dynamic exposure parameter setting can be of great use to a digital camera user in many situations. For example, the user may desire to pan across a given scene keeping the exposure metering region, i.e., the group of pixels upon whose values the auto exposure algorithm will at least in part base the setting of the camera's exposure parameters, over the human subject of interest's face so that the scene of interest remains properly exposed, e.g., on the camera's preview screen, as the digital camera user pans across the scene. As the digital camera user pans across the scene, the face of the subject of interest may move with respect to the frame. In one embodiment disclosed herein, to compensate for the user's movement of the digital camera across the scene and/or the movement of the subject of interest within the scene, the exposure metering region may track the movement of the subject of interest's face with some predetermined lag so that the scene remains properly exposed without resulting in visually jarring lighting effects on the camera's preview screen caused by, e.g., exposure settings changing abruptly or even oscillating.

At some point, however, the original subject of interest may disappear from the camera's preview screen altogether. At that point, it may be appropriate to return to a more standard auto exposure algorithm, such as one that bases exposure parameters on a mean, center-weighted mean, median, or weighted value of the image's brightness. Later, a new human subject of interest may enter the scene and again become the appropriate subject on which the scene should be auto exposed. Thus, the exposure metering region can again be drawn over the new human subject of interest's face and begin to track the movement of the new human subject of interest's face, while setting exposure parameters accordingly.

In accordance with another embodiment disclosed herein, there may be several human faces in the current scene. In such situations, it may be desirable to select a "primary face" in the scene based on any number of desired primacy criteria, e.g., the size of a face, a face's duration as the "primary face," or even the number of facial features detected in the face. In some embodiments, once a face has been determined to be the "primary face" in the scene, it will remain the "primary face" until it has disappeared from the scene for some predetermined amount of time. By intelligently metering, i.e., calculating the brightness level for the scene according to a desired formula, and exposing the scene based at least in part on the pixels making up the "primary face," the face detection-assisted dynamic auto exposure algorithm will be able to avoid any visually jarring lighting effects on the camera's preview screen and continue to expose the scene correctly, even as larger faces temporarily pop into or out of the scene or smaller faces appear in the background of the scene, e.g., faces in a crowd or people standing off at a distance.

In accordance with yet another embodiment disclosed herein, in lieu of selecting a single "primary face" in complex scenes containing several human faces, it may be desirable to base the camera's exposure parameters at least in part on a weighted average of exposure metering regions over each of, or some subset of, the several faces in the scene. For example, there may be some predetermined qualifying criteria by which the several faces will be selected, e.g., the size of a face, a face's duration in the scene, or even the number of facial features detected in the face. The camera may then select each "qualifying face" in the scene, i.e., each face meeting the qualifying criteria, and base the setting of the camera's exposure parameters, e.g., exposure time or gain, on a weighted average of exposure metering regions over each qualifying face. For example, larger faces may be weighted more heavily than smaller faces in the "multi-face" scenario described here.

In accordance with yet another embodiment disclosed herein, it may be desirable to give the user the ability to manually override the operation of the face detection-assisted dynamic auto exposure algorithms as described above. For example, the digital camera user may be able to manually override the operation of the face detection-assisted dynamic auto exposure algorithm by touching or programmatically selecting a desired portion of the preview screen corresponding to an object(s) in the scene upon which they would like the focus and/or exposure parameters of the camera to be based. By again touching or programmatically selecting a human face or faces in the preview screen corresponding to a face or faces in the scene upon which they would like the focus and/or exposure parameters of the camera to be based, the digital camera user can reinitiate the operation of a face detection-assisted dynamic auto exposure algorithm in accordance with any of the embodiments disclosed herein.

Because of efficiencies gained by the embodiments disclosed herein, the face detection-assisted dynamic auto exposure method described below may be implemented directly in a personal electronic device's hardware and/or software, making the method readily applicable to any number of personal electronic devices possessing digital cameras, such as digital video cameras, mobile phones, personal data assistants (PDAs), portable music players, or laptop/desktop/tablet computers. Alternatively, the face detection-assisted dynamic auto exposure method described below may be implemented in conventional cameras.

DETAILED DESCRIPTION

This disclosure pertains to a system, computer readable medium, and method for dynamically setting a camera's exposure parameters based on face detection. While this disclosure discusses a new technique for face detection-assisted dynamic auto exposure, one of ordinary skill in the art would recognize that the techniques disclosed may also be applied to other contexts and applications as well. The techniques disclosed herein are applicable to any number of electronic devices with digital image sensors, such as digital cameras, digital video cameras, mobile phones, personal data assistants (PDAs), portable music players, computers, and conventional cameras. An embedded processor, such a Cortex® A8 with the ARM'® v7-A architecture, provides a versatile and robust programmable control device that may be utilized for carrying out the disclosed techniques, (CORTEX® and ARM® are registered trademarks of the ARM Limited Company of the United Kingdom.)

Figure 1:
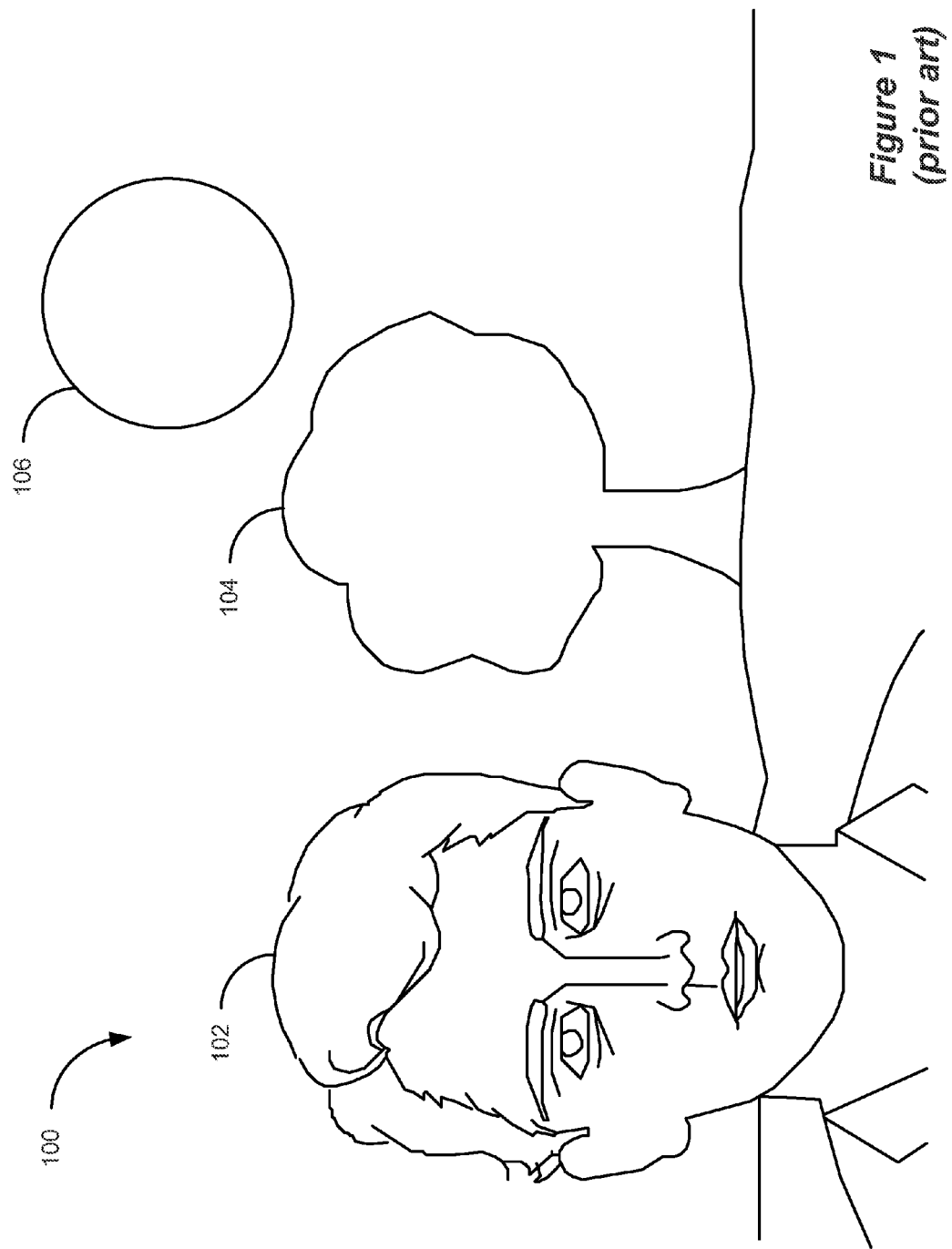
FIG. 1 illustrates a typical outdoor scene with a human subject, in accordance with one embodiment.

Referring to FIG. 1, a typical outdoor scene 100 with a human subject 102 is shown, in accordance with one embodiment. The scene 100 also includes the Sun 106 and a natural object, tree 104. As will be explained in further detail below, in some embodiments, the face of human subject 102 will be treated differently by the dynamic auto exposure algorithm than a non-face object, such as tree 104. This is important because, in a scene such as is shown in FIG. 1, the photographer would often want a photograph of the scene to have the camera's photographic properties, such as focus and exposure, based on the face of human subject 102, rather than on the background objects, e.g. tree 104 or Sun 106. Especially in cases of outdoor scenes, such as that shown in FIG. 1, the Sun 106 can have a large—and often detrimental—effect on the way a camera using a standard exposure algorithm meters the scene. Because of the very large brightness values that will be measured in pixels in the upper half of the scene due to the Sun, cameras using a standard exposure algorithm will tend to meter and expose the scene in such a manner that the person's face will be quite dark and the background will be more fully exposed.

Figure 2:
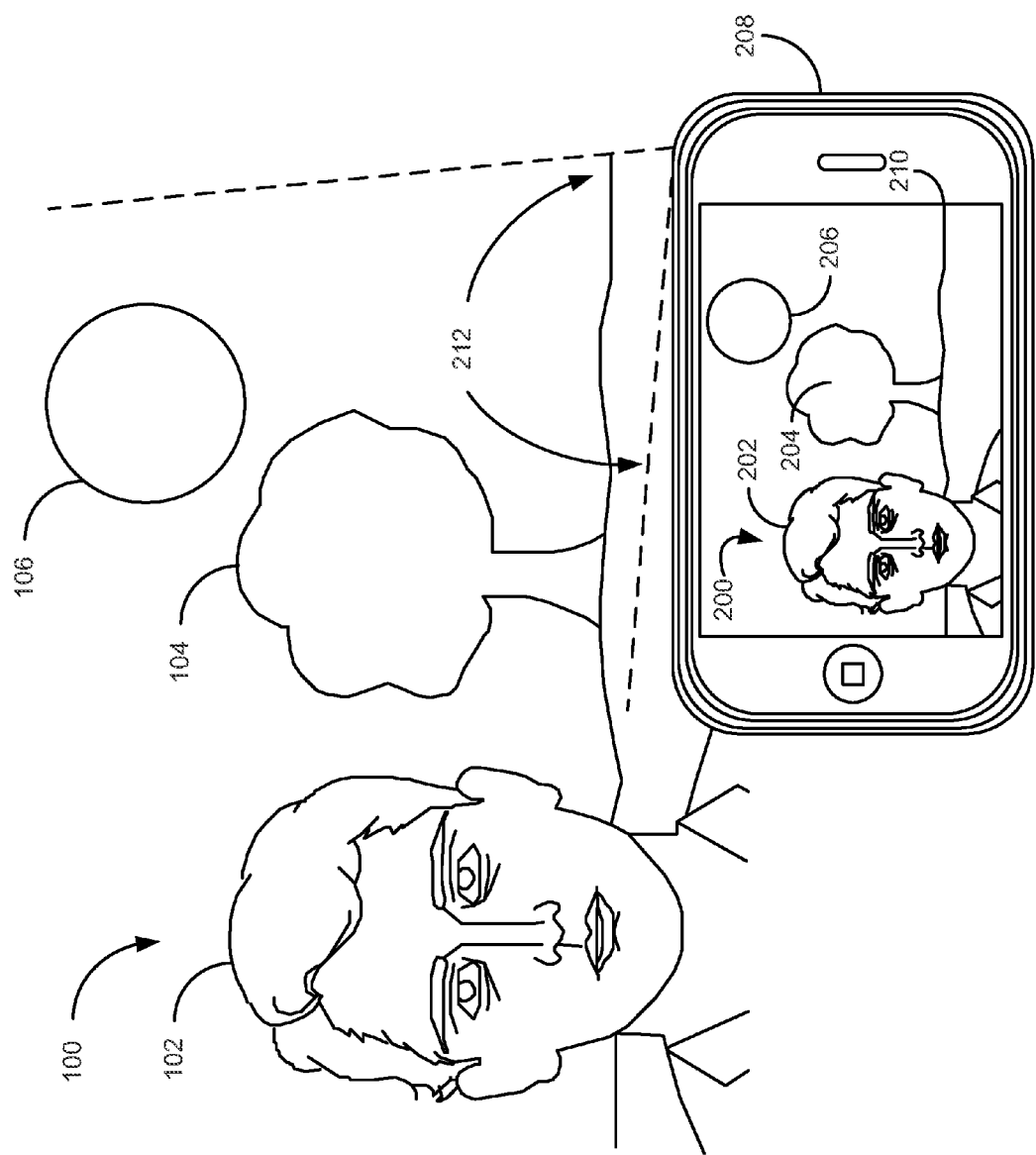
FIG. 2 illustrates a typical outdoor scene with a human subject as viewed on a camera's preview screen, in accordance with one embodiment.

Referring now to FIG. 2, a typical outdoor scene 200 with a human subject 202 as viewed on a camera device 208's preview screen 210 is shown, in accordance with one embodiment. The dashed lines 212 indicate the viewing angle of the camera lens (not shown) on the reverse side of camera device 208. As mentioned previously, although camera device 208 is shown here as a mobile phone, the teachings presented herein are equally applicable to any electronic device possessing a camera, such as, but not limited to: digital video cameras, personal data assistants (PDAs), portable music players, laptop/desktop/tablet computers, or conventional cameras. Each object in the scene 100 has a corresponding representation in the scene 200 as viewed on a camera device 208's preview screen 210. For example, human subject 102 is represented as object 202, tree 104 is represented as object 204, and Sun 106 is represented as object 206.

Figure 3:
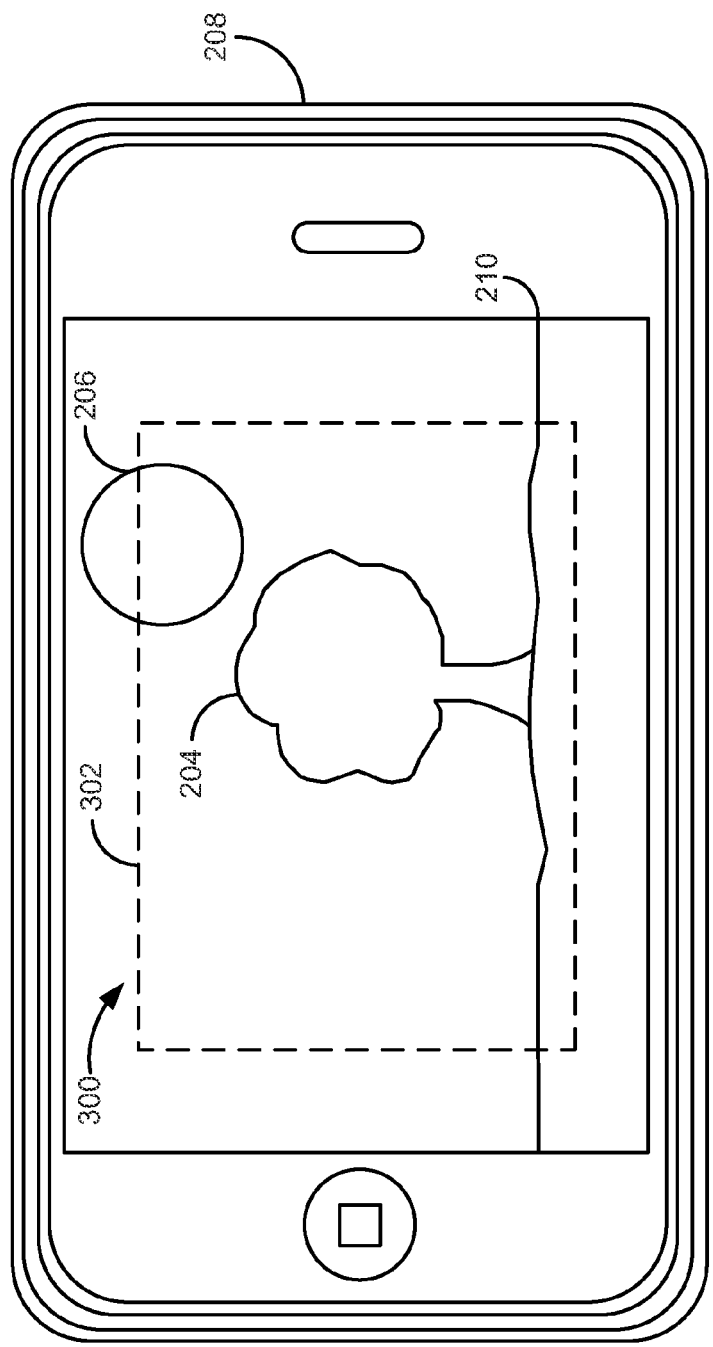
FIG. 3 illustrates a typical exposure metering region for an outdoor scene with a human subject, in accordance with one embodiment.

Referring now to FIG. 3, a typical exposure metering region, exposure metering rectangle 302, for an outdoor scene 300 without a human subject is shown, in accordance with one embodiment. In this exemplary embodiment, the exposure metering rectangle 302 has dimensions that are 75% of the corresponding dimensions of camera device 208's preview screen 210. That is, exposure metering rectangle 302's width is 75% of the width of camera device 208's preview screen 210 and exposure metering rectangle 302's height is 75% of the height of camera device 208's preview screen 210. The 75% dimension choice is not strictly necessary, but it has been empirically determined that choosing an exposure metering rectangle 302 of this size can help exposure determinations from being overly influenced by light sources located at the periphery of the frame, e.g., overhead lights at the top of an image. In auto exposure algorithms according to some embodiments, an exposure metering region, such as exposure metering rectangle 302, is inset over the frame, and the camera's exposure parameters are driven such that the average brightness of the pixels within exposure metering rectangle 302 are equal or nearly equal to an 18% gray value. For example, with 12-bit luminance (i.e., brightness) values, the maximum luminance value is $2^{12}$, or 4096, and, thus, an 18% gray value would be 4096*0.18, or approximately 737. If the scene is brighter than the optimum 18% gray value, the camera could, e.g., decrease the exposure time, t, whereas, if the scene were darker than the optimum 18% gray value, the camera could, e.g., increase the exposure time, t. A simple, rectangle-based auto exposure algorithm, such as that explained above with regard to FIG. 3 may work satisfactorily for a scene that does not have any human subjects in ft, but may lead to undesirable photos if there is a human subject in the scene, as is explained further in regard to FIG. 4.

Figure 4:
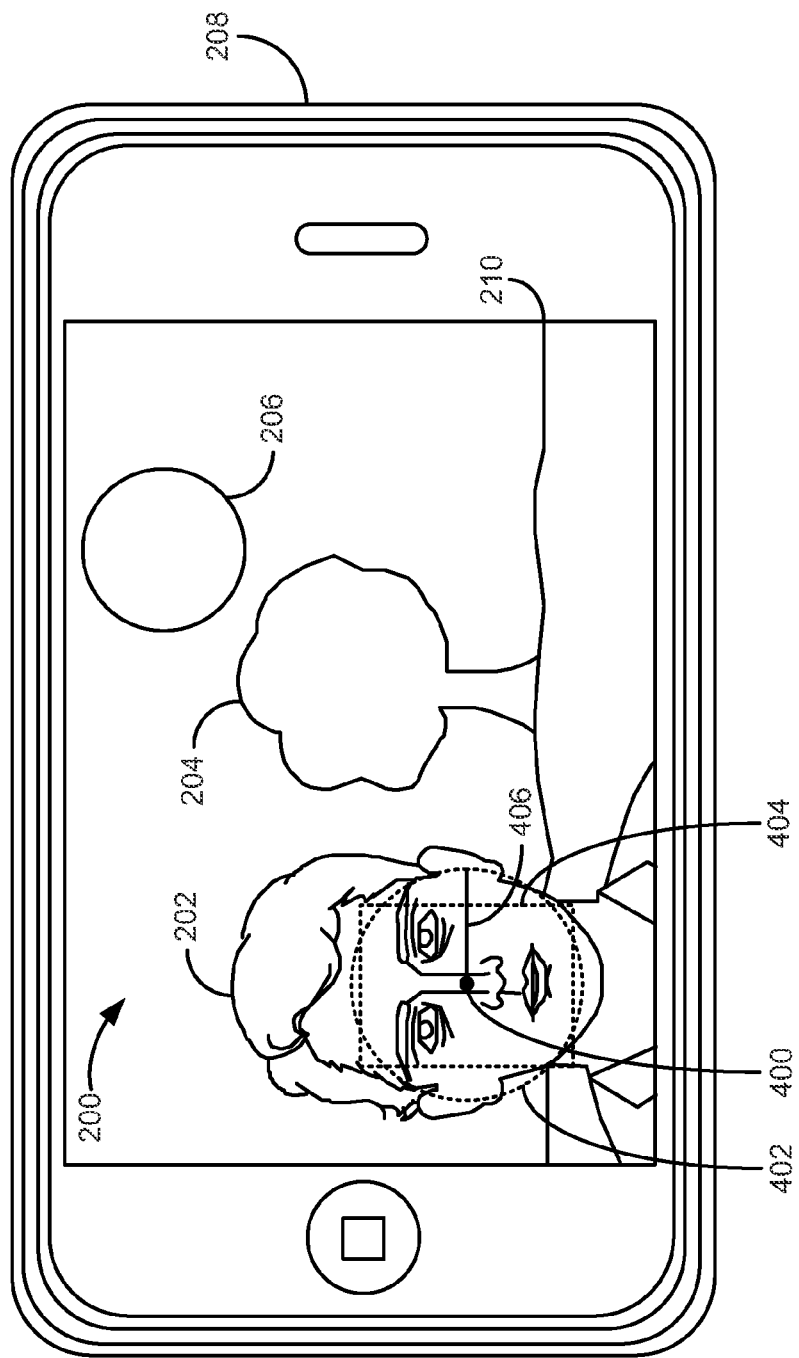
FIG. 4 illustrates a face detection-assisted exposure metering region for an outdoor scene with a human subject, in accordance with one embodiment.

Referring now to FIG. 4, a face detection-assisted exposure metering region, exposure metering rectangle 404, for an outdoor scene 200 with a human subject 202 is shown, in accordance with one embodiment. In FIG. 4, because the scene 200 contains a human subject, an intelligent face detection-assisted dynamic auto exposure algorithm in accordance with one embodiment disclosed herein will be able to locate each face in the scene 200. Facial detection algorithms are known in the art, and any one or more of a number of such known algorithms, e.g., Viola Jones, Rowley Baluja Kanade, or Schneiderman Kanade, may be chosen to perform the dynamic face detection over the scene that is currently being displayed, e.g., on camera device 208's preview screen 210. Some face detection algorithms are able to create and store a list of all faces in the scene, representing each face as a group of values consisting of, e.g., a center point location, a facial orientation, and a radial length of the face-enclosing circle determined by the face detection algorithm. In FIG. 4, the face of human subject 202 is represented by center point 400 and radius 406 and is oriented upwardly with respect to the screen 210's shown orientation. Center point 400 and radius 406 define a face-enclosing circle 402 that substantially covers the face of human subject 202. However, due to the ovular nature of most faces found in images, face-enclosing circle 402 may also contain a substantial number of pixels that are not part of human subject 202's face. Thus, it can be beneficial to create a face-enclosing rectangle, such as face-enclosing rectangle 104, that is more inset over the human subject's face, in an attempt to contain only the human subject's face and nothing outside of the facial region. Various dimensions may be chosen for face-enclosing rectangle 404, but, in one embodiment, it has been empirically determined that centering the face-enclosing rectangle 404 at the center point 400 of face-enclosing circle 402, and giving the face-enclosing rectangle 404 a width that is equal to ($11/16$) of the diameter of face-enclosing circle 402 and a height that is equal to ($14/16$) of the diameter of face-enclosing circle 402 has lead to visually pleasing images. By subsequently driving the setting of the camera's exposure parameters based at least in part on pixels located within the exposure metering region defined by face-enclosing exposure metering rectangle 404 rather than a broader exposure metering region, e.g., exposure metering rectangle 302 in FIG. 3, that may contain many brighter background pixels, the scene may be exposed in a way that more favorably exposes human subject 202's face and leads to more visually pleasing images. For example, a face detection-assisted dynamic auto exposure algorithm in accordance with one embodiment may attempt to drive the camera's exposure parameters such that the average brightness of the pixels within face-enclosing rectangle 404 is equal or nearly equal to an 18% gray value.

Figure 5:
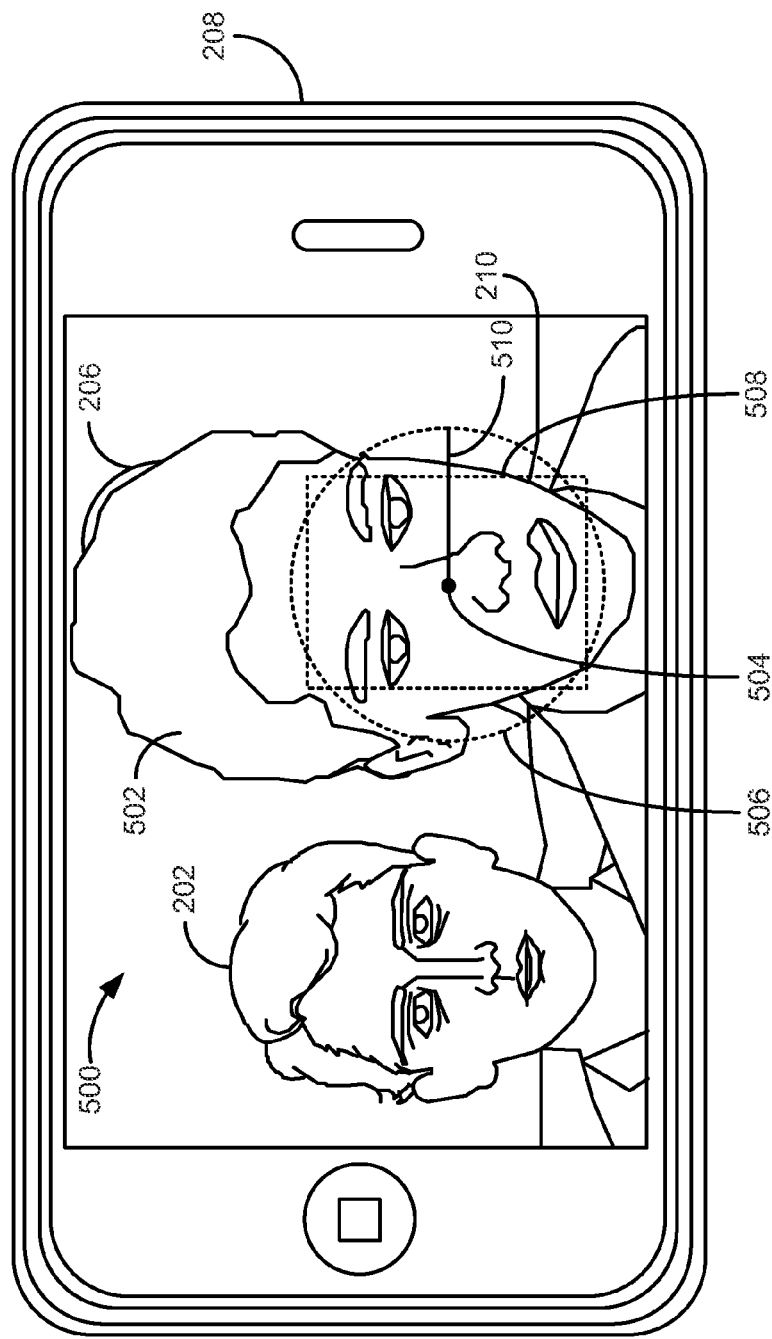
FIG. 5 illustrates a face detection-assisted exposure metering region for an outdoor scene with two, differently-sized human subjects, in accordance with one embodiment.

Referring now to FIG. 5, a face detection-assisted exposure metering rectangle 508 for an outdoor scene 500 with two, differently-sized human subjects (202 and 502) is shown, in accordance with one embodiment. In many photographic scenes, e.g., scene 500, there can be more than one human subject, and, thus, more than one human face that may be of interest to the photographer. According to one embodiment of an intelligent face detection-assisted dynamic auto exposure algorithm, the face-enclosing exposure metering rectangle 508 is placed over the "primary face" in the scene 500, e.g., the largest face in the scene 500. As with the embodiment described in relation to FIG. 4 above, the use of a known face detection algorithm may return a center point location, a facial orientation, and radial length of a face-enclosing circle for each face located by the face detection algorithm. In FIG. 5, the face of human subject 502 is represented by center point 504 and radius 510 and is oriented upwardly with respect to the screen 210's shown orientation. Center point 504 and radius 510 define a face-enclosing circle 506 that substantially covers the face of human subject 502. In FIG. 5, the face-enclosing exposure metering rectangle 508 derived from face-enclosing circle 506 for human subject 502 is larger than the face-enclosing exposure metering rectangle 404 derived from face-enclosing circle 402 for human subject 202 described in relation to FIG. 4. Thus, in this embodiment, and as shown in FIG. 5, the intelligent face detection-assisted dynamic auto exposure algorithm has determined that it will base the driving of the camera's exposure parameters at least in part on the pixels within the exposure metering region defined by face-enclosing exposure metering rectangle 508, i.e., the "primary face" for scene 500. The determination of "primary face" for the scene need not be based solely on the size of the face. In fact, in some instances, it may be desirable to base the determination of "primary face" on some combination of other factors, such as: a given face's duration in the scene, the number of facial features (as determined by the face detection algorithm) in the face, or whether the face is recognized, e.g., as being a preferred face such as a family member. For example, if human subject 202 had been standing in scene 500 for some substantial amount of time, i.e., long enough to establish himself as the "primary face" in scene 500, and human subject 502 was merely walking quickly across scene 500 or had just briefly leaned into scene 500, even though human subject 502's face may be larger than human subject 202's face in scene 500, it may be desirable to keep human subject 202 as the "primary face" in scene 500 until human subject 502 has established himself in scene 500 for some predetermined amount of time, so as to avoid any visually jarring lighting effects on the camera device 208's preview screen 210. As another example, if human subject 202 were standing next to a large tree, e.g., tree 204, that did not possess a large number of human-like facial features, but possessed enough human-like facial features to be classified as a human face by the face detection algorithm (i.e., the tree caused the face detection algorithm to give a "false positive" human face match), it may be more desirable to maintain human subject 202 as the "primary face" if it is scored as more "face-like" (e.g., containing more facial features) than tree 204, even though tree 204 may be larger than the face of human subject 202. Such "primary face" criteria may be determined empirically until the camera is producing visually pleasing images in a satisfactory percentage of scenes or may be configurable by the digital camera user at any time.

Another common occurrence when pointing a camera at a scene containing human subjects is that a "primary face" may be located, the intelligent face detection-assisted dynamic auto exposure algorithm then begins to drive the camera's exposure parameters accordingly, and then the "primary face" is no longer present in the scene, i.e., the "primary face" is "gone." This may occur if, for instance, the person suddenly bends down or leans over out of the frame, suddenly changes the orientation of their head, turns their head to present a profile view to the camera, the scene experiences a sudden lighting change, or for any other number of reasons. In these instances of a "disappearing" primary face, and according to one embodiment, it may be desirable to maintain the exposure metering region over the location of the primary face for a predetermined amount of time, e.g., two seconds, (in the hopes that the primary face might "reappear" near the same location) before returning to a default exposure metering region, e.g., exposure metering rectangle 302 as shown in FIG. 3, so as to avoid any visually jarring lighting effects on the camera device 208's preview screen 210. In another embodiment, if the "primary face" disappears for a predetermined amount of time but other faces are still present in the scene, the intelligent face detection-assisted dynamic auto exposure algorithm may determine the "new primary face" in the scene and then begin to move the exposure metering rectangle towards the "new primary face" after a predetermined amount of time, e.g., 0.5 seconds.

In accordance with yet another embodiment, the decision as to which face in a given scene should be designated as the "primary face" in the scene can be based at least in part on the "seniority" of the "primary face." That is, in some embodiments, it may be desirable that, once a face has been designated the "primary face" in the scene by the intelligent face detection-assisted dynamic auto exposure algorithm according to the desired factor(s) (e.g., face size), it cannot be replaced as the "primary face" in the scene until it is "gone" from the scene for a predetermined amount of time. For example, if the "primary face" decision in a given implementation is based on face size, and a first face is established as the "primary face," it would remain the "primary face" even if a second, larger face came into—and remained—in the scene. If the "primary face" were to disappear from the scene for a predetermined amount of time, the intelligent face detection-assisted dynamic auto exposure algorithm could then make a new "primary face" determination.

Figure 6:
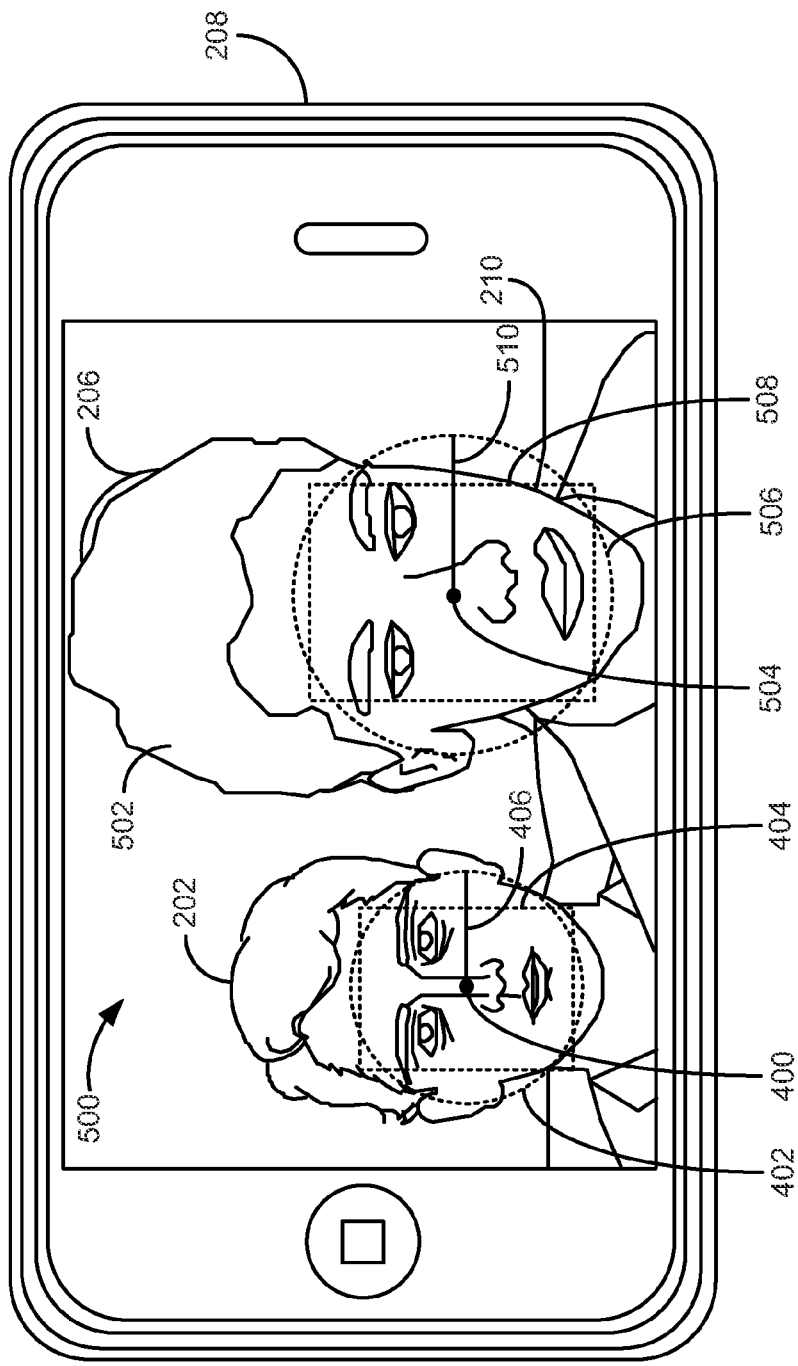
FIG. 6 illustrates two face detection-assisted exposure metering regions for an outdoor scene with two, differently-sized human subjects, in accordance with one embodiment.

Referring now to FIG. 6, two face detection-assisted exposure metering rectangles 404 and 508 for an outdoor scene 500 with two, differently-sized human subjects 202 and 502 are shown, in accordance with one embodiment. In this so-called "multiple qualifying faces" embodiment, there may not be a single "primary face" upon which the camera's exposure parameters are at least in part based; rather, there may be multiple faces meeting some predetermined qualifying criteria that are used to drive the camera's exposure parameters. For example, in one embodiment, the scene is metered and the camera's exposure parameters are driven based at least in part on a weighted average of pixel values within exposure metering regions inset over each "qualifying face." As shown in FIG. 6, the camera's exposure parameters would be driven based at least in part on pixel values within each of the two face detection-assisted exposure metering rectangles, 404 and 508. In one embodiment the pixel values from the various exposure metering rectangles could be weighted by, e.g., the relative size of the exposure metering rectangle in which the pixels are located. Of course, the weighting could be based on any number of parameters, e.g., the relative duration as a "qualifying face" of the exposure metering region in which the pixels are located. In some embodiments, the intelligent face detection-assisted dynamic auto exposure algorithm can track up to n "qualifying faces" at any given time, where n is a maximum number limited only by the processing power that the camera has available. In other embodiments, the smallest face that the intelligent face detection-assisted dynamic auto exposure algorithm will consider tracking is one with an exposure metering rectangle that is (1/16) of the frame height. This can be useful in scenes with a large number of faces in the background of the frame, such as a crowd or audience.

Figure 7:
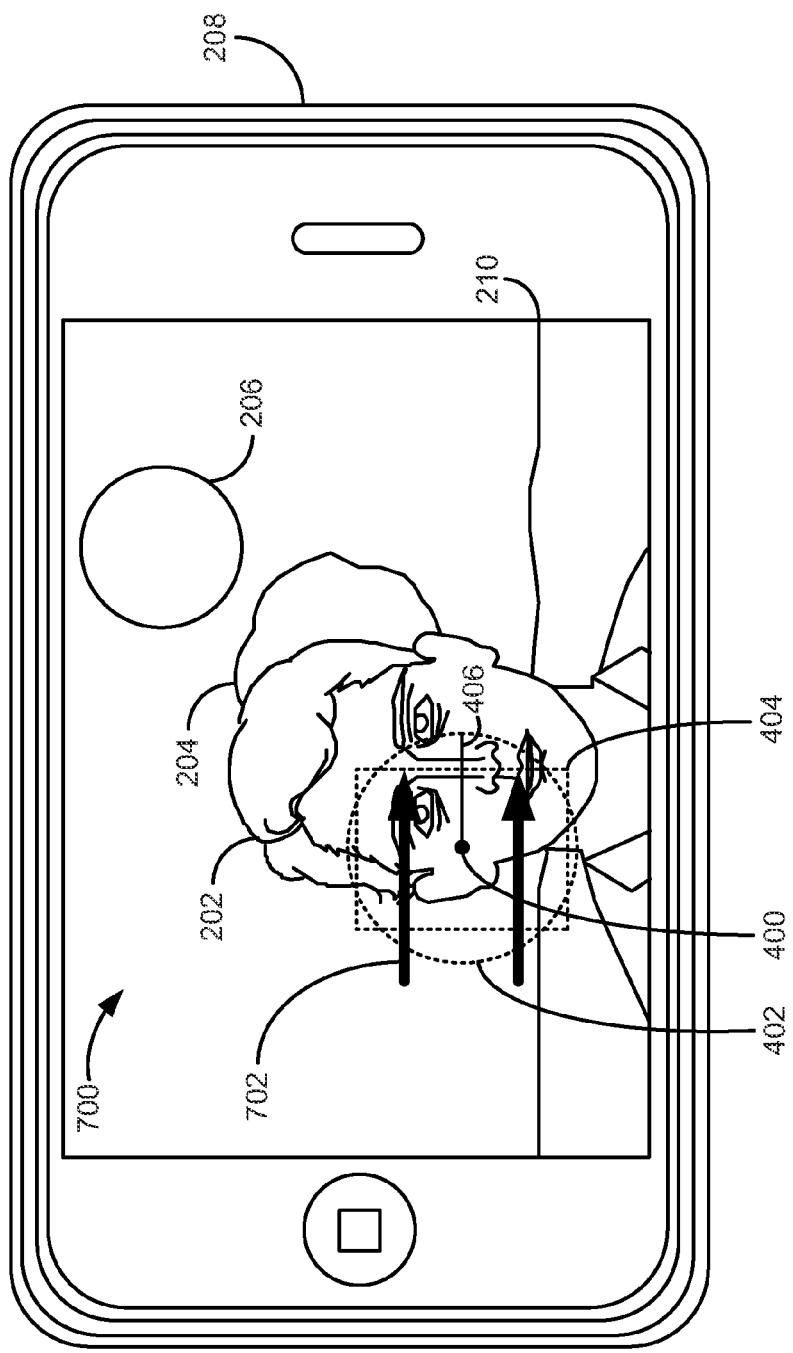
FIG. 7 illustrates a lagging face detection-assisted exposure metering region for an outdoor scene with a human subject, in accordance with one embodiment.

Referring now to FIG. 7, a lagging face detection-assisted exposure metering rectangle 104 for an outdoor scene 700 with a human subject 202 is shown, in accordance with one embodiment. As mentioned previously, the user of a digital camera having an intelligent face detection-assisted dynamic auto exposure algorithm may desire to pan across a given scene, while keeping the exposure metering rectangle over the human subject of interest's face so that the scene of interest remains properly exposed on the camera device's preview screen. Alternately, the human subject of interest may move within the scene while the user keeps the camera still. As the digital camera user pans across the scene, or as the human subject of interest moves within the scene, the face of the subject of interest may move with respect to the preview screen. Because the image currently appearing on the camera device's preview screen has already been exposed, there is some amount of latency between the scene displayed on the camera device's preview screen and the actual scene itself.

In one embodiment, to compensate for the latency, the user's movement of the digital camera 208 across the scene 700 and/or the movement of the human subject of interest 202 within the scene, the exposure metering rectangle 404 may track the movement of the human subject of interest 202's face with some predetermined lag so that the scene remains properly exposed and limits any visually jarring lighting effects on the camera device's preview screen. The use of a lagging technique can also dampen the effects of false positives appearing in the scene. For example, if a large face or "face-like" object suddenly and temporarily appeared across the scene from the current "primary face," it may meet enough of the "primary face" criteria that it supplants the current "primary face." Thus, rather than immediately moving the exposure metering rectangle 404 across the scene to enclose the suddenly (and temporarily) appearing large face or "face-like" object, the exposure metering rectangle 404 could track across the scene and change in size according to predetermined lag parameters. In this way, when the temporarily appearing large face or face-like object disappears, the exposure metering rectangle will not have moved as far or resized itself as dramatically as it would have if it would have immediately "snapped" to the size and position of the temporarily appearing large face or "face-like" object. When the temporarily appearing large face or "face-like" object has disappeared, the exposure metering rectangle can then begin to return to the current "primary face" within the scene, according to the same predetermined lag parameters. In FIG. 7, movement vectors 702 show the direction in which exposure metering rectangle 404 will move to catch up with the movement of human subject of interest 202, who, in scene 700, has moved to a more central location, i.e., in front of tree 204. The values of the lag parameters may be determined empirically to give satisfactory visual results. In one embodiment, favorable results have been achieved by choosing lag parameters causing the exposure metering rectangle to move towards the new "primary face" target in 7% steps, while increasing or decreasing the size of the exposure metering rectangle to the size of the new "primary face" target in 10% steps, wherein the steps by which the exposure metering rectangle moves and/or changes size take place every 66 milliseconds.

Figure 8:
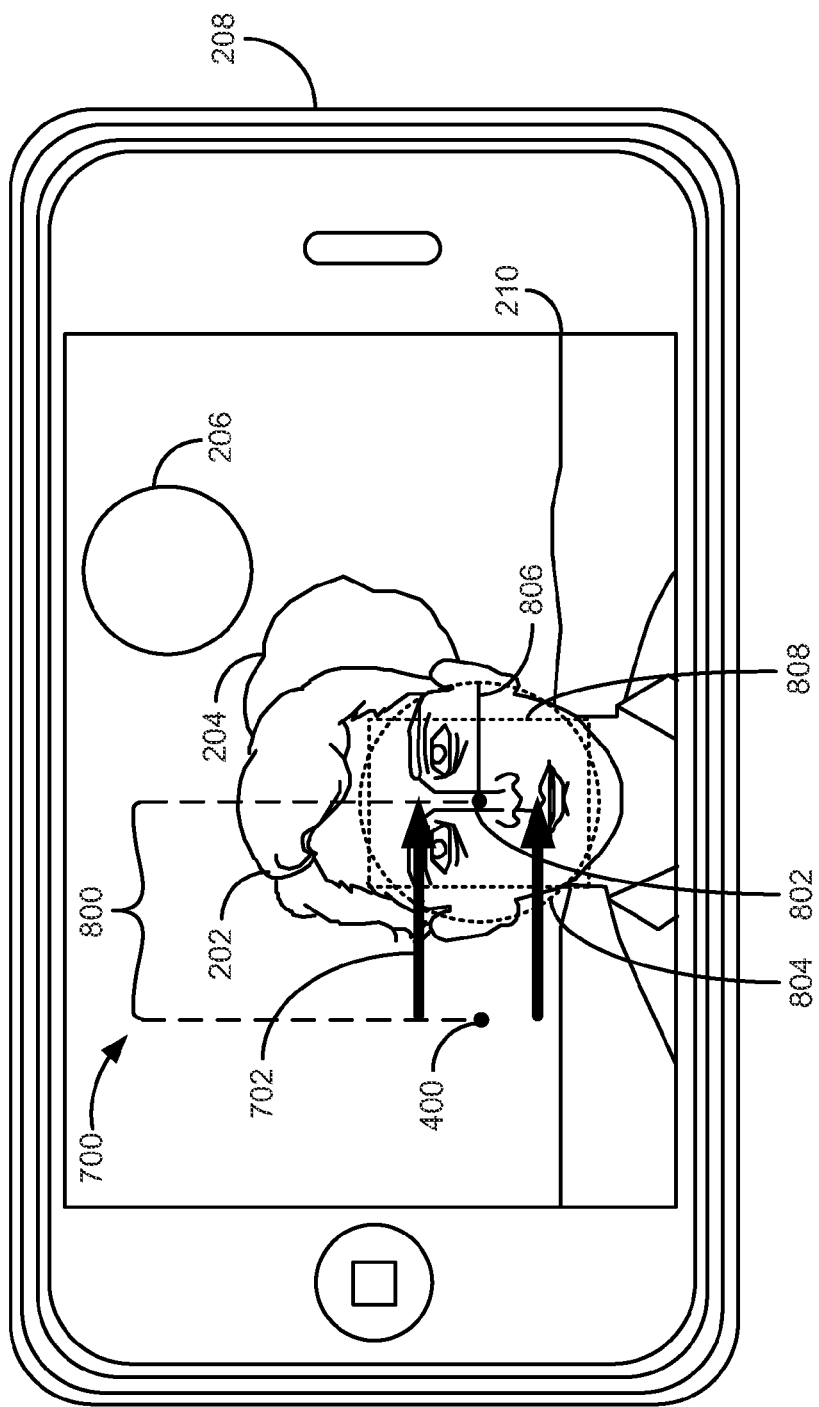
FIG. 8 illustrates a moving face detection-assisted exposure metering region for an outdoor scene with a human subject, in accordance with one embodiment.

Referring now to FIG. 8, a moving face detection-assisted exposure metering rectangle 808 for an outdoor scene 700 with a human subject 202 is shown, in accordance with one embodiment. FIG. 8 shows the same scene 700 as is shown in FIG. 7, but at a later moment in time when exposure metering rectangle 808 has caught up to the "primary face," i.e., the face of human subject of interest 202. In one embodiment, the exposure metering rectangle 808 will have moved according to predetermined lag parameters, as described above with reference to FIG. 7. As with the example referred to in FIG. 4, the size and position of exposure metering rectangle 808 are determined according to desired parameters and based off values returned by the face detection algorithm, e.g., the location of updated center point 802, an orientation vector, and an updated face-enclosing circle 804 having radius 806. In this example, the size of exposure metering rectangle 808 is the same as the size of exposure metering rectangle 104 shown in FIG. 7, but this does not necessarily have to be so. For example, human subject of interest 202 could also have moved closer to the camera as he moved within the scene 700 to a more central location. If that were the case, the size of exposure metering rectangle 808 would also have increased as it moved across the scene according to the predetermined lag parameters. As is shown in FIG. 8, the exposure metering region defined by exposure metering rectangle 808 has moved from an original position centered over center point 400 representing human subject of interest 202's previous location to a position centered over center point 802, representing human subject of interest 202's current location. The distance between center points 400 and 802 is represented by offset 800. As previously mentioned, in one embodiment, exposure metering rectangle 808 moves from an original position centered over center point 400 to a position centered over center point 802 in a series of incremental steps that are of a predetermined size and taken at predetermined time intervals.

Figure 9:
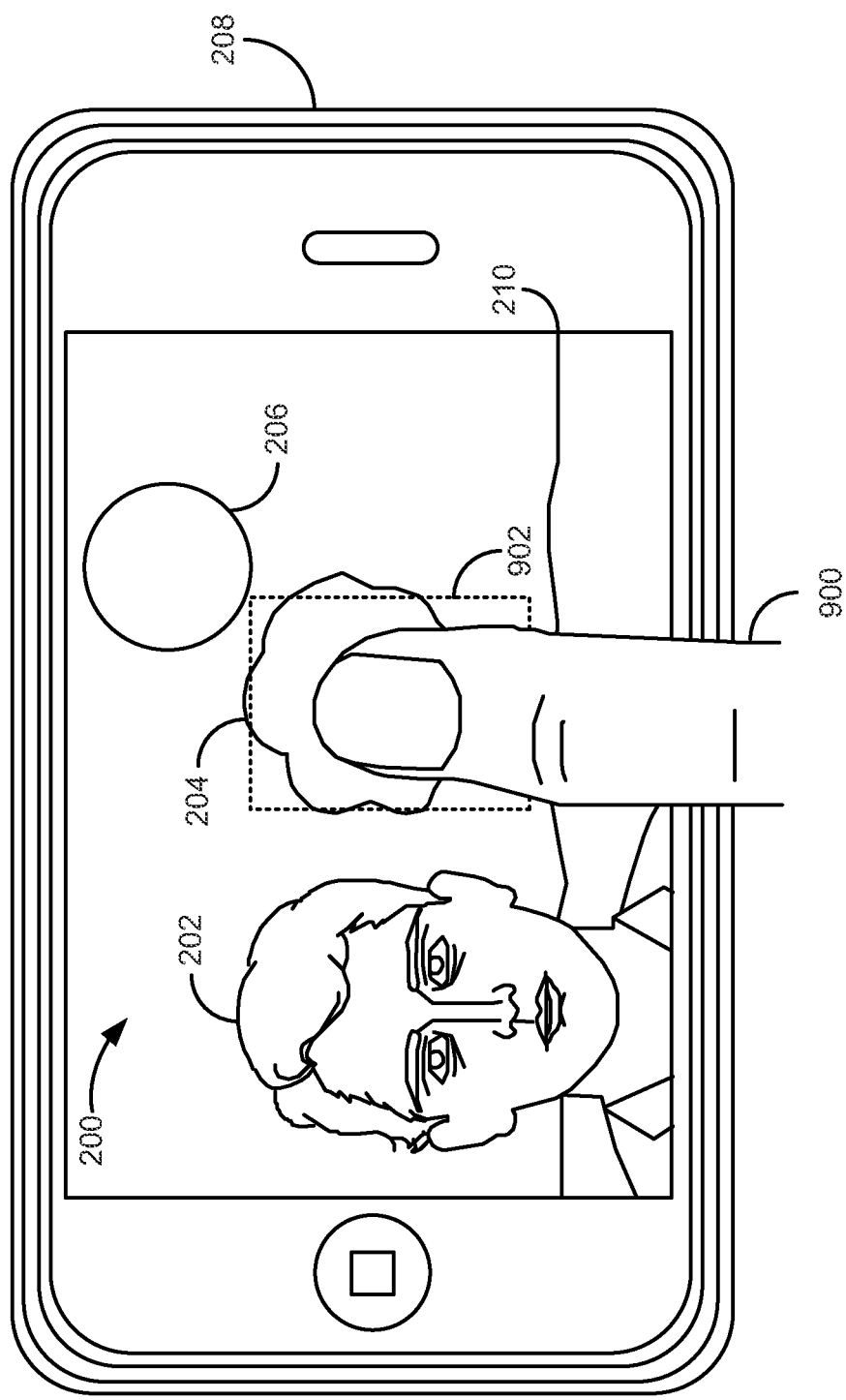
FIG. 9 illustrates a manually overridden exposure metering region for an outdoor scene with a human subject, in accordance with one embodiment.

Referring now to FIG. 9, a manually overridden exposure metering rectangle 902 for an outdoor scene 200 with a human subject 202 is shown, in accordance with one embodiment. In accordance with the embodiment shown in FIG. 9, it may be desirable to give the digital camera user the ability to manually override the operation of the intelligent face detection-assisted dynamic auto exposure algorithm. For example, the digital camera user may be able to manually override the operation of the intelligent face detection-assisted dynamic auto exposure algorithm by (in the case of a touchscreen preview screen) touching the camera device's preview screen 210 using one or more digits 900 to indicate a desired portion of the camera device's preview screen 210 corresponding to an object(s) in the scene upon which the user would like the camera's focus and/or exposure parameters to be at least in part based. Alternately, the digital camera user may be able to programmatically select a desired portion of the camera device's preview screen 210 corresponding to an object(s) in the scene upon which he or she would like the camera's focus and/or exposure parameters to be at least in part based. For example, the user may be able to manipulate controls on the camera device to manually move the exposure metering rectangle over the scene. As illustrated in FIG. 9, the user has indicated that the exposure metering rectangle be placed over tree 204 by touching the preview screen with digit 900 in the area where tree 204 is located. This could serve to override the camera device's intelligent face detection-assisted dynamic auto exposure algorithm, which would likely attempt to place the exposure metering rectangle over the face of human subject 202 by default. Such a manual override feature can be useful in instances wherein the digital camera user considers a non-face object to be the most important part of the photo, i.e., the part that he would like to be focused and exposed correctly. If the user of the digital camera wishes to turn off the manual overriding functionality, he or she may do so at any time by again touching or programmatically selecting a human face or faces on the preview screen upon which they would like the focus and/or exposure parameters of the camera to be at least in part based. If it is determined that the digital camera user has re-selected a human face or faces, the camera can then reinitiate the operation of the intelligent face detection-assisted dynamic auto exposure algorithm as described above.

Figure 10:
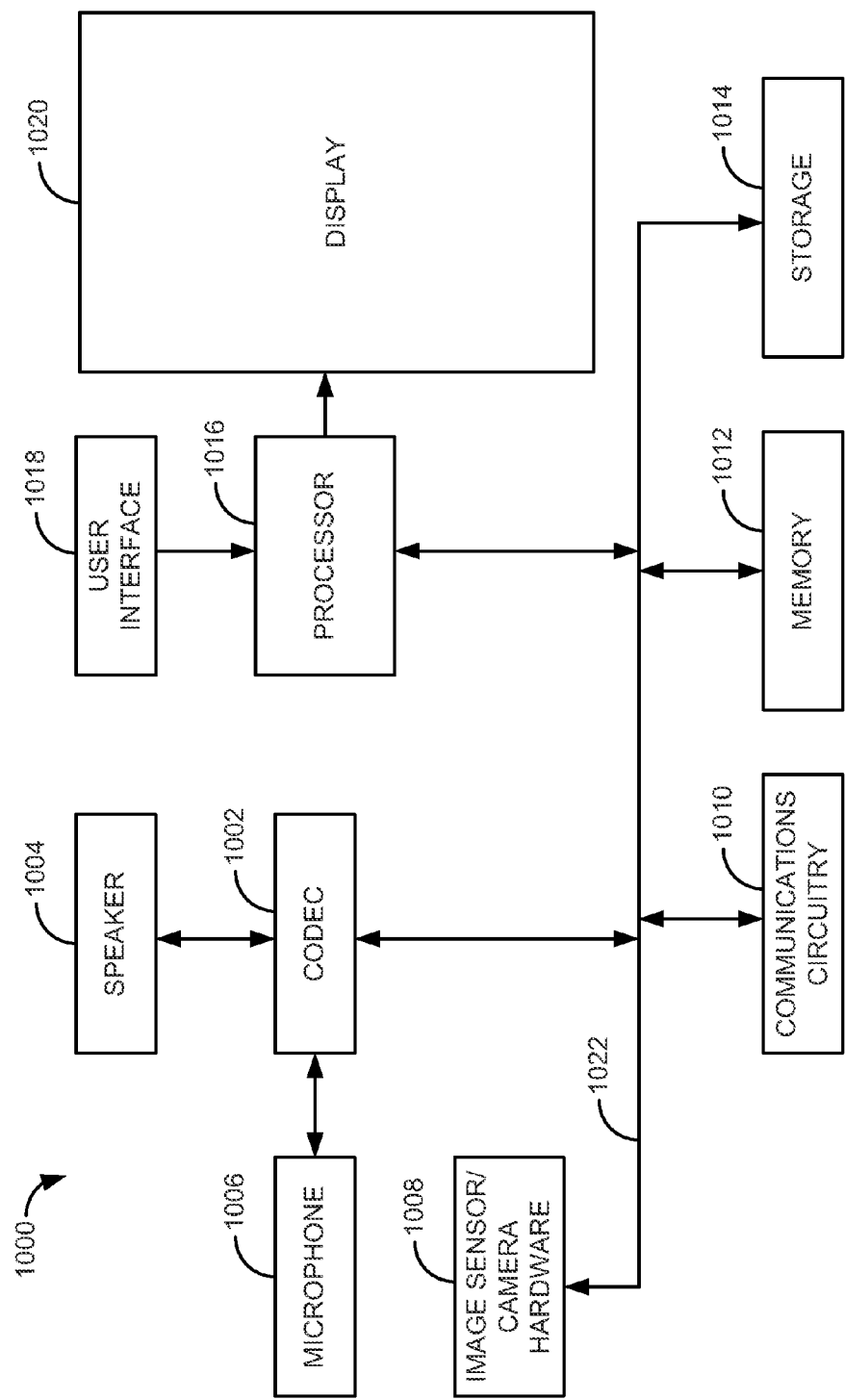
FIG. 10 illustrates a simplified functional block diagram of a personal electronic device, in accordance with one embodiment.

Referring now to FIG. 10, a simplified functional block diagram of a representative personal electronic device 1000 according to an illustrative embodiment, e.g., a mobile phone possessing a camera device such as camera device 208, is shown. The personal electronic device 1000 may include a processor 1016, storage device 1014, user interface 1018, display 1020, coder/decoder (CODEC) 1002, bus 1022, memory 1012, communications circuitry 1010, a speaker or transducer 1004, a microphone 1006, and an image sensor with associated camera hardware 1008. Processor 1016 may be any suitable programmable control device and may control the operation of many functions, such as the intelligent face detection-assisted dynamic auto exposure algorithm discussed above, as well as other functions performed by personal electronic device 1000. Processor 1016 may drive display 1020 and may receive user inputs from the user interface 1018.

Storage device 1014 may store media (e.g., photo and video files), software (e.g., for implementing various functions on device 1000), preference information (e.g., media playback preferences), personal information, and any other suitable data. Storage device 1014 may include one more storage mediums, including for example, a hard-drive, permanent memory such as ROM, semi-permanent memory such as RAM, or cache.

Memory 1012 may include one or more different types of memory which may be used for performing device functions. For example, memory 1012 may include cache, ROM, and/or RAM. Bus 1022 may provide a data transfer path for transferring data to, from, or between at least storage device 1014, memory 1012, and processor 1016, CODEC 1002 may be included to convert digital audio signals into analog signals for driving the speaker 1004 to produce sound including voice, music, and other like audio. The CODEC 1002 may also convert audio inputs from the microphone 1006 into digital audio signals for storage in memory 1012 or storage 1014. The CODEC 1002 may include a video CODEC for processing digital and/or analog video signals.

User interface 1018 may allow a user to interact with the personal electronic device 1000. For example, the user input device 1018 can take a variety of forms, such as a button, keypad, dial, a click wheel, or a touch screen. Communications circuitry 1010 may include circuitry for wireless communication (e.g., short-range and/or long range communication). For example, the wireless communication circuitry may be Wi-Fi® enabling circuitry that permits wireless communication according to one of the 802.11 standards. (Wi-Fi® is a registered trademark of the Wi-Fi Alliance.) Other wireless network protocols standards could also be used, either as an alternative to the identified protocols or in addition to the identified protocols. Other network standards may include BLUETOOTH®, the Global System for Mobile Communications (GSM®), and code division multiple access (CDMA) based wireless protocols. (BLUETOOTH® is a registered trademark of Bluetooth SIG, Inc., and GSM® is a registered trademark of GSM Association.) Communications circuitry 1010 may also include circuitry that enables device 1000 to be electrically coupled to another device (e.g., a computer or an accessory device) and communicate with that other device.

In one embodiment, the personal electronic device 1000 may be a personal electronic device dedicated to processing media such as audio and video. For example, the personal electronic device 1000 may be a media device such as media player, e.g., an MP3 player, a game player, a remote controller, a portable communication device, a remote ordering interface, an audio tour player, or other suitable personal device.

The personal electronic device 1000 may be battery-operated and highly portable so as to allow a user to listen to music, play games or video, record video or take pictures, communicate with others, and/or control other devices. In addition, the personal electronic device 1000 may be sized such that it fits relatively easily into a pocket or hand of the user. By being handheld, the personal computing device 1000 may be relatively small and easily handled and utilized by its user and thus may be taken practically anywhere the user travels.

As discussed previously, the relatively small form factor of certain types of personal electronic devices 1000, e.g., personal media devices, enables a user to easily manipulate the device's position, orientation, and movement. Accordingly, the personal electronic device 1000 may provide for improved techniques of sensing such changes in position, orientation, and movement to enable a user to interface with or control the device 1000 by affecting such changes. Further, the device 1000 may include a vibration source, under the control of processor 1016, for example, to facilitate sending motion, vibration, and/or movement information to a user related to an operation of the device 1000. The personal electronic device 1000 may also include an image sensor and associated camera hardware 1008 that enables the device 1000 to capture an image or series of images, i.e., video, continuously, periodically, at select times, and/or under select conditions.

Figure 11:
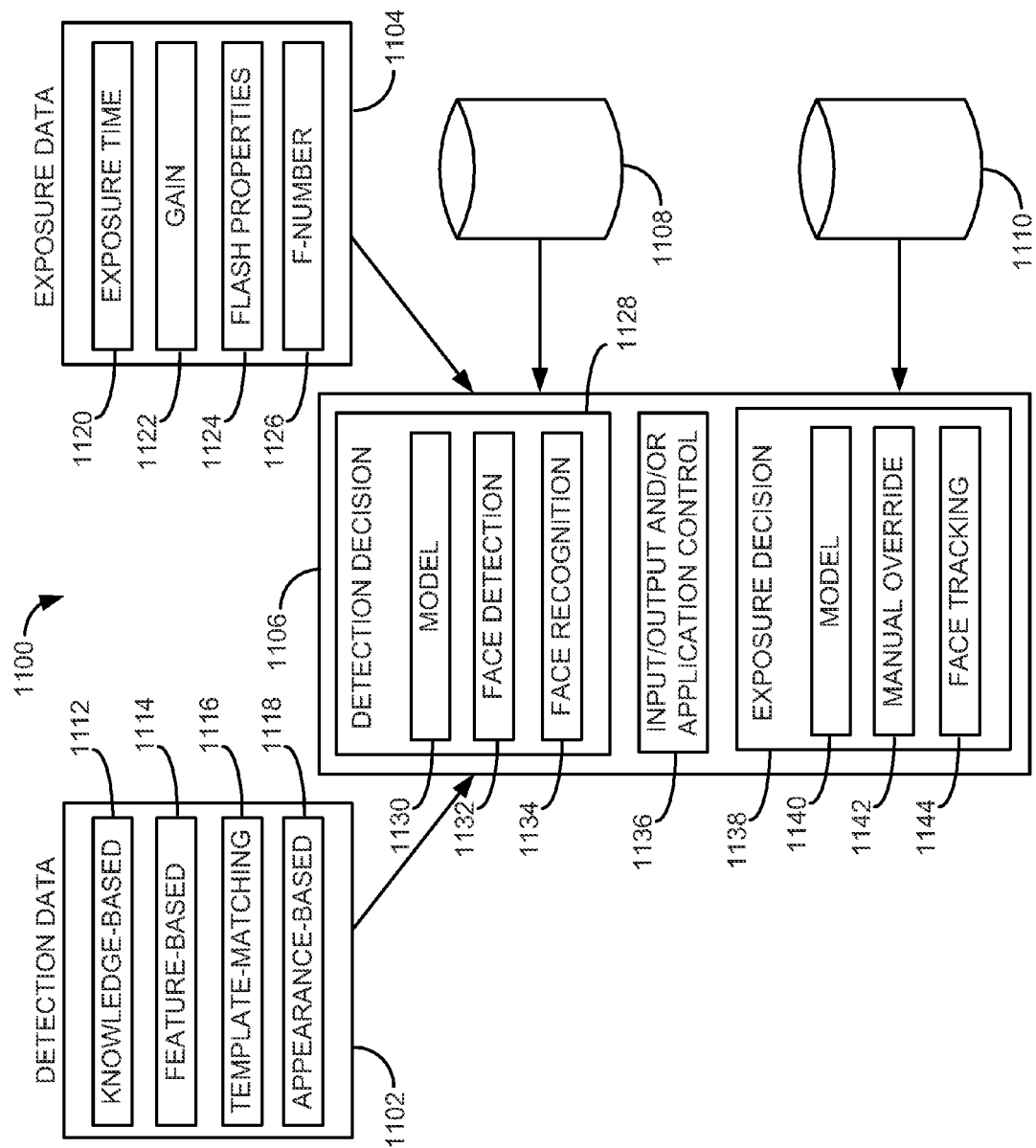
FIG. 11 illustrates a diagram of a computer processing environment including various application or routines running within a personal electronic device, in accordance with one embodiment.

Referring now to FIG. 11, a diagram of a computer processing environment 1100 including various applications or routines running within a personal electronic device according to an illustrative embodiment is shown. The processing environment 1100 may include an application space 1106 comprising detection decision application 1128, an exposure decision application 1138, and an input/output and/or application control application 1136. The environment 1100 may also include detection data 1102 and exposure data 1104, a face feature database 1108 and/or an input/output interface configuration database 1110. The detection data 1102 may include, without limitation, data associated with knowledge-based detection techniques 1112, feature-based detection techniques 1114, template matching techniques 1116, and/or appearance-based detection techniques 1118.

In certain embodiments, the input/output control application 1136 and/or another application configure the input and/or output characteristics, e.g., preferences as to primacy and qualification criteria and/or lag parameters, of an intelligent face detection-assisted dynamic auto exposure algorithm running on a personal electronic device. The decision application 1128 may determine the presence of a face in the present scene by comparing received image data from an image sensor that is scanning an area with a known set of data associated with at least one of techniques 1112, 1114, 1116, and 1118. The decision application 1128 may include a decision model 1130, a face detection application 1132, and/or a face recognition application 1134. In one embodiment, the model 1130 includes a model based on at least one of the knowledge-based detection technique 1112, the feature-based detection technique 1114, the template matching technique 1116, and the appearance-based technique 1118.

Knowledge-based techniques may be based on rule-based and/or top-down methods that encode prior knowledge of features that are present in a typical human face. The rules may include relationships between facial features and may be advantageous for face localization.

Feature-based and/or feature invariant techniques specify structural features of a face that exist under varying conditions such as changes in pose, viewpoint, image quality, and/or lighting. This technique may be advantageous for face localization. Feature invariant techniques may include, without limitation, facial feature data, facial texture data, facial skin color data, and/or a combination of color, size, and shape of a face.

Template matching techniques may include methods of storing standard features of a face and using a correlation between an input image and the stored patterns to detect a face or faces. Template matching may include, without limitation, pre-defined templates and/or deformable templates.

Appearance-based techniques may include models that are learned from a set of images that capture the variability of facial features. Appearance-based techniques may include, without limitation, eigenface data, distribution-based data, neural networks, support vector machines, naive Bayes classifiers, hidden Markov models, and information theoretical approaches.

Face detection and face recognition are different processes. Face detection includes the process of detection and/or locating a face or faces within an image. Face recognition includes the process of recognizing that a detected face is associated with a particular person or user. Face recognition, however, is typically performed after face detection.

The use of face detection and recognition can offer more effective control and interaction between a user and a personal electronic device. In certain embodiments, a personal electronic device such as camera device 208 may employ facial recognition as a further "primary face" criteria, as described above in reference to FIG. 5. For example, one embodiment of an intelligent face detection-assisted dynamic auto exposure algorithm may give greater preference to a face in an image if the face is on a list of known or preferred faces, e.g., family members.

The exposure decision application 1138 may include a decision model 1140, a manual override application 1142, and/or a face tracking application 1144. In one embodiment, the model 1140 includes a model based on manipulating at least one of the exposure time 1120, gain 1122, flash properties 1124 (e.g., whether or not to use a flash, what duration of flash to use, or how bright of a flash to use), f-number 1126, and any other exposure parameter that the personal electronic device's software is able to manipulate. In some embodiments, the exposure decision model 1140 decides how pixel values corresponding to multiple faces in a scene will be weighted in the camera's ultimate decision of how to drive the various exposure data 1120, 1122, 1124, 1126 in an effort to create a visually pleasing image. In certain embodiments, the manual override application 1142 may be used to create an exposure model based on user-specified desired exposure metering regions and according to user-specified parameters and may be toggled on or off via user interaction. In other embodiments, face tracking application 1144 is used to implement the motion and size lag techniques described with reference to FIGS. 7 and 8 above based on user or system specified lag parameters. In certain embodiments, the face tracking application 1144 may be toggled on or off via user interaction.

Figure 12:
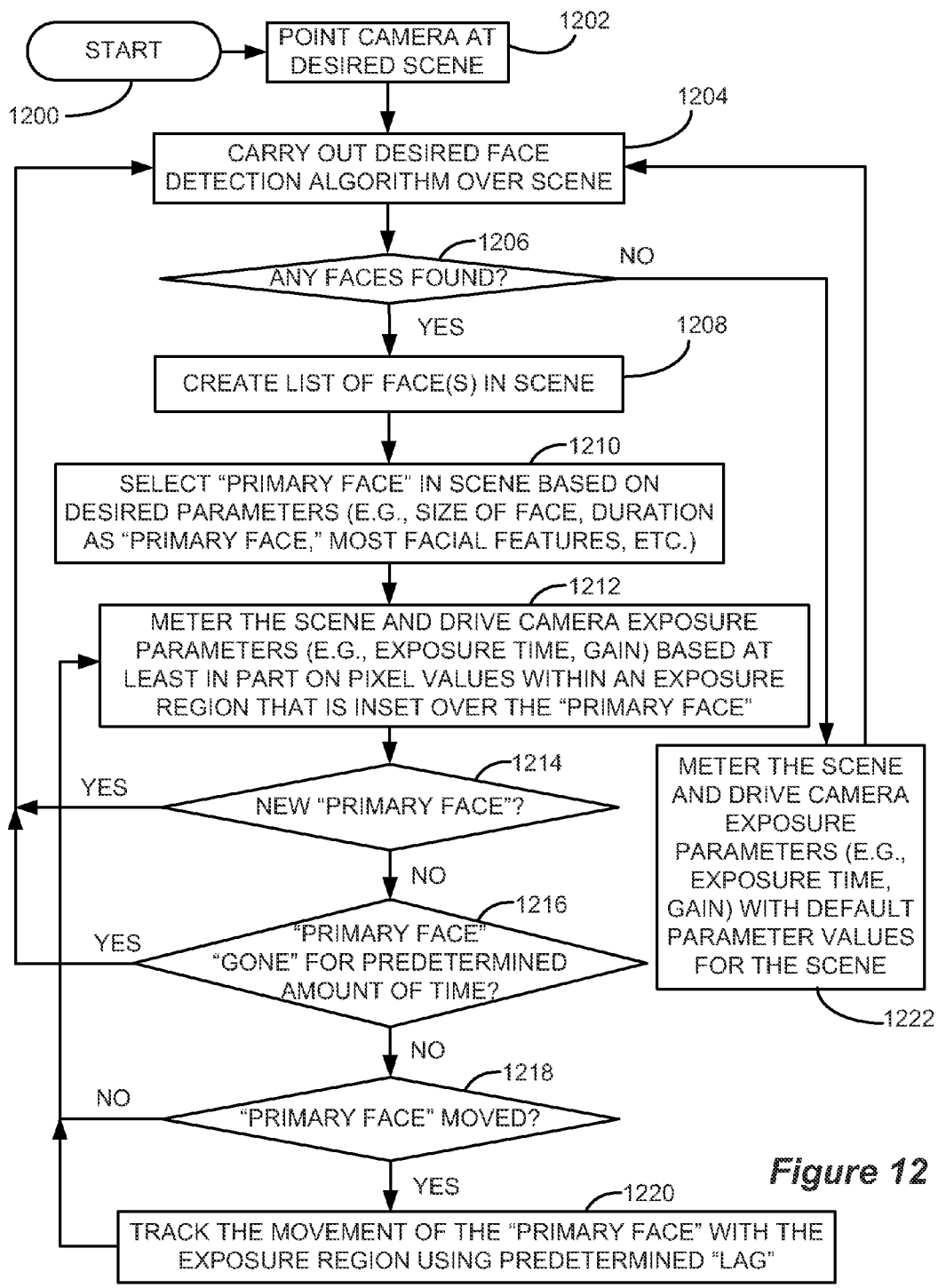
FIG. 12 illustrates, in flowchart form, one embodiment of a process for face detection-assisted dynamic auto exposure using a primary face, in accordance with one embodiment.

Referring now to FIG. 12, one embodiment of a process for face detection-assisted dynamic auto exposure using a primary face is shown in flowchart form. First, the process for face detection-assisted dynamic auto exposure using a primary face begins at Step 1200. The user of the digital camera device points the camera at his or her desired scene (Step 1202). Next the camera-possessing personal electronic device dynamically and continuously carries out the desired face detection algorithm over the current scene (Step 1204). If any faces are located (Step 1206), the personal electronic device can create a list of each face in the scene (Step 1208).

At that point the personal electronic device can select a "primary face" in the scene based on desired primacy criteria parameters, e.g., the size of a face, a face's duration in the scene, a face's duration as the "primary face," the number of facial features, etc. (Step 1210). Next, the personal electronic device can meter the scene and drive camera exposure parameters, e.g., exposure time or gain, based at least in part on pixel values within an exposure metering region that is inset over the "primary face" (Step 1212). As the personal electronic device is continuously and dynamically executing the process shown in FIG. 12, it is always scanning for a new "primary face" (Step 1214), that is, a face whose primacy criteria make it a stronger candidate to be the "primary face" than the current "primary face." If such a face is found, the process can return to Step 1204 and locate, select, and meter the scene based on the newly found "primary face." If such a face is not found at Step 1214, the process can then determine whether or not the "primary face" has been gone from the scene for a predetermined amount of time (Step 1216). A face can disappear from a scene for any number of reasons, e.g., if a person suddenly bends down or leans over out of the frame, suddenly changes the orientation of their head, turns their head to present a profile view to the camera, or the scene experiences a sudden lighting change. If it is determined at Step 1216 that the "primary face" has been gone from the scene for a predetermined amount of time, the process can return to Step 1204 and attempt to locate, select, and meter the scene based on a newly found "primary face." If it is determined at Step 1216 that the "primary face" has not been gone from the scene for a predetermined amount of time, the process can determine whether or not the primary face has moved since the previous time interval (Step 1218). If it is determined at Step 1218 that the "primary face" moved since the previous time interval, the process can initiate a face tracking routine such as that described in reference to FIGS. 7 and 8 to track the movement of the "primary face" with the exposure metering region according to predetermined lag parameters (Step 1220). If the "primary face" has not moved since the previous interval, the process can simply return to Step 1212 and continue to meter the scene and drive camera exposure parameters based at least in part on pixel values within the exposure metering region that is inset over the "primary face." If at any point during the execution of the process it is determined that no faces are found at Step 1206, the process can revert to metering the scene and driving camera exposure parameters with default values for the scene, e.g., based on an exposure metering rectangle having width and height dimensions that are 75% as large as the image and centered over the image (Step 1222).

Figure 13:
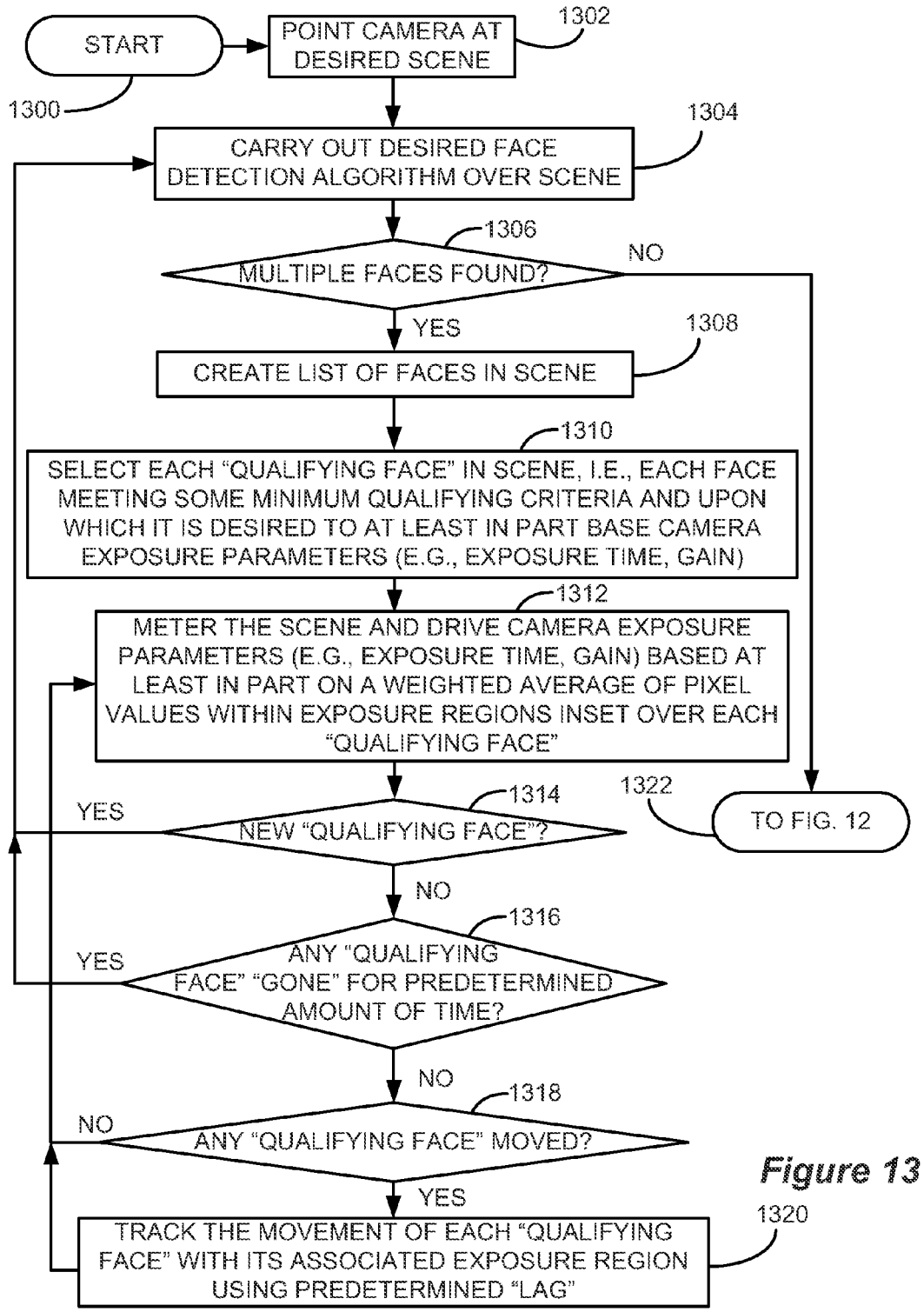
FIG. 13 illustrates, in flowchart form, one embodiment of a process for face detection-assisted dynamic auto exposure using multiple qualifying faces, in accordance with one embodiment.

Referring now to FIG. 13, one embodiment of a process for face detection-assisted dynamic auto exposure using multiple qualifying faces is shown in flowchart form. First, the process for face detection-assisted dynamic auto exposure using multiple qualifying faces begins at Step 1300. The user of the digital camera device points the camera at his or her desired scene (Step 1302). Next the camera-possessing personal electronic device dynamically and continuously carries out the desired face detection algorithm over the current scene (Step 1304). If multiple faces are not located (Step 1306), the process can exit to the single, "primary face" process described in relation to FIG. 12 (Step 1322). If instead, multiple faces are located (Step 1306), the personal electronic device can create a list of each face in the scene (Step 1308). At that point, the personal electronic device can select each "qualifying face" in the scene based on desired minimum qualifying criteria parameters, e.g., the size of a face, a face's duration in the scene, a face's duration as the "qualifying face," the number of facial features, etc. (Step 1310). Next, the personal electronic device can meter the scene and drive camera exposure parameters, e.g., exposure time or gain, based at least in part on a weighted average of the pixel values within the exposure metering regions that are inset over the "qualifying face(s)" (Step 1312). As mentioned in relation to FIG. 6 above, the weighting of pixels from the various exposure metering regions may be based on any desired parameter(s), e.g., the relative size of the exposure metering region in which the pixels are located. As the personal electronic device is continuously and dynamically executing the process shown in FIG. 13, it is always scanning for a new "qualifying face(s)" (Step 1314), that is, a face whose qualifying criteria are such that the face scores high enough to be considered a "qualifying face." If such a face is found, the process can return to Step 1304 and locate, select, and meter the scene based at least in part on each of the newly found "qualifying faces." If such a face is not found at Step 1314, the process can then determine whether or not a "qualifying face" has been gone from the scene for a predetermined amount of time (Step 1316). If it is determined at Step 1316 that a "qualifying face" has been gone from the scene for a predetermined amount of time, the process can return to Step 1301 and locate, select, and meter the scene based at least in part on any remaining "qualifying faces" in the scene. If it is determined at Step 1316 that none of the "qualifying faces" have been gone from the scene for a predetermined amount of time, the process can determine whether or not any qualifying face has moved since the previous time interval (Step 1318). If it is determined at Step 1318 that any "qualifying face" moved since the previous time interval, the process can initiate a face tracking routine over each qualifying face that has moved, such as that described in reference to FIGS. 7 and 8 (Step 1320). If no "qualifying face" has moved since the previous interval, the process can simply return to Step 1312 and continue to meter the scene and drive camera exposure parameters based at least in part on a weighted average of the pixel values within the exposure metering regions that are inset over the "qualifying face(s)." If at any point during the execution of the process it is determined that multiple faces are not found at Step 1306, the process can exit to the single, "primary face" process described in relation to FIG. 12 (Step 1322).

Figure 14:
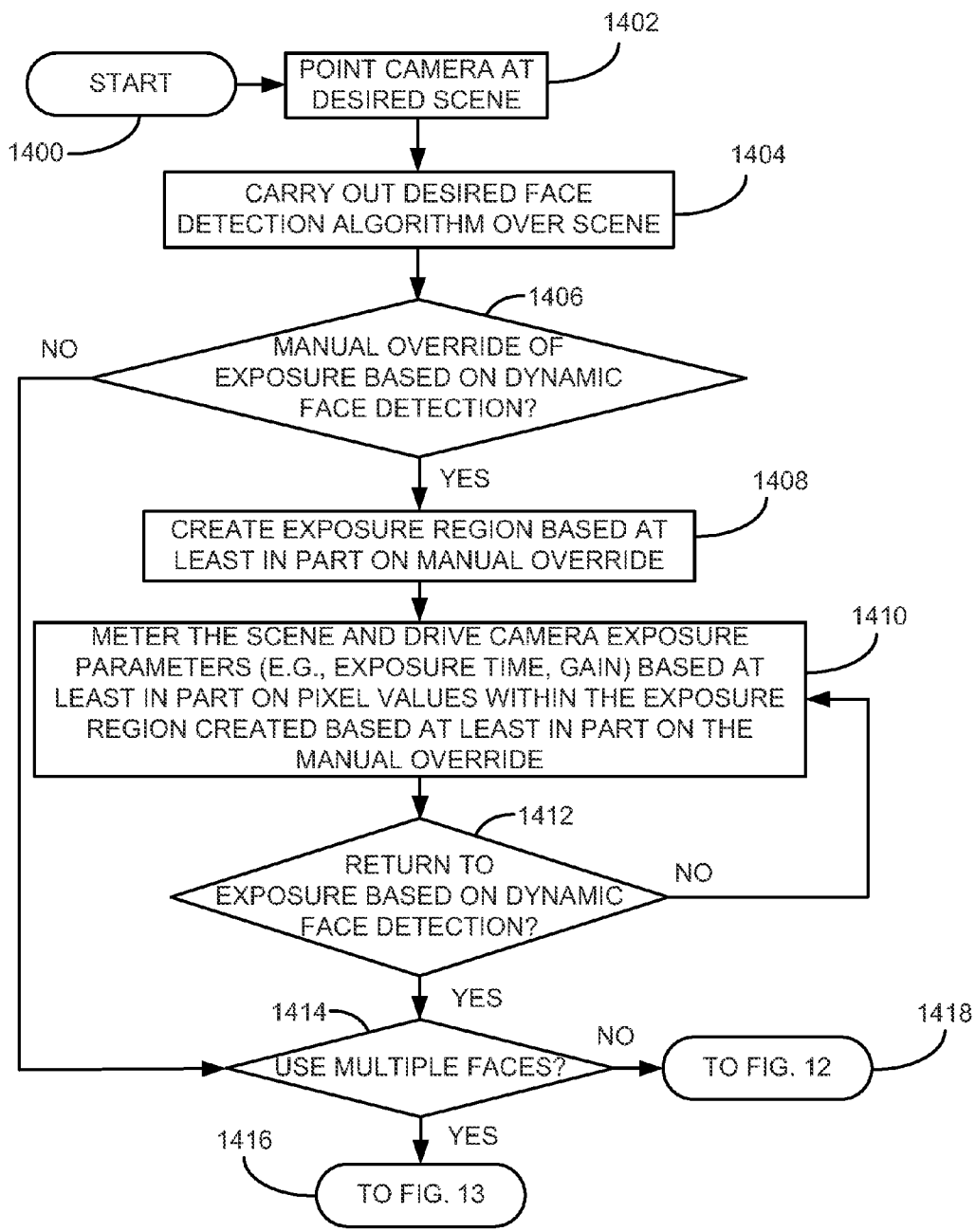
FIG. 14 illustrates, in flowchart form, one embodiment of a process for manually overriding face detection-assisted dynamic auto exposure, in accordance with one embodiment.

Referring now to FIG. 14, one embodiment of a process for manually overriding face detection-assisted dynamic auto exposure is shown in flowchart form. First, the process for manually overriding face detection-assisted dynamic auto exposure begins at Step 1400. The user of the digital camera device points the camera at his or her desired scene (Step 1402). Next the camera-possessing personal electronic device carries out the desired face detection algorithm over the current scene (Step 1404). If the user indicates a desire to manually override the face detection-assisted dynamic auto exposure process (Step 1406), the process can create an exposure metering region based at least in part on the user's manual override indication, e.g., the location a user touches on a touchscreen preview screen (Step 1408). Next, the process can meter the scene and drive camera exposure parameters based at least in part on the pixel values within an exposure metering region that is created over the area indicated by the user in his or her manual override indication (Step 1410). If, at any point, the user indicates a desire to return to face detection-assisted dynamic auto exposure (e.g., Step 1406, Step 1412), e.g., by touching a location(s) on a touchscreen preview screen corresponding to human face(s), the process will stop manually overriding the face detection-assisted dynamic auto exposure algorithm. At that point (Step 1414), if the user desires to use multiple qualifying faces, the process can exit to the "multiple qualifying faces" process described in relation to FIG. 13 (Step 1416). If instead, at Step 1414, the user does not desire to use multiple qualifying faces, the process can exit to the single, "primary face" process described in relation to FIG. 12 (Step 1418). If at Step 1412, the user does not indicate a desire to return to face detection-assisted dynamic auto exposure, the process can simply continue to meter the scene and drive camera exposure parameters based at least in part on the pixel values within the exposure metering region over the area indicated by the user in his or her manual override indication, taking care to update the location of the exposure metering region as the user manually indicates a desire to drive camera exposure parameters based on a different location within the scene (Step 1410).

The foregoing description is not intended to limit or restrict the scope or applicability of the inventive concepts conceived of by the Applicant. As one example, although the present disclosure focused on driving exposure parameters based at least in part on the dynamic detection of human faces within a scene; it will be appreciated that the teachings of the present disclosure can be applied to other contexts, e.g.: driving the shape of tone mapping curves, gamma correction curves, flash brightness levels, or other custom image settings based at least in part on the dynamic detection of the location and size of human faces within a scene. In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. A dynamic auto exposure system comprising:
an image sensor for capturing an image representative of a scene;
a memory coupled to the image sensor; and
a programmable control device communicatively coupled to the image sensor and the memory, wherein the memory includes instructions for causing the programmable control device to perform a dynamic auto exposure method on image information received from the image sensor, the method comprising:
detecting one or more faces in the image information;
determining that one or more of the detected faces meet a predetermined criterion;
creating an exposure metering region over the one or more detected faces meeting the predetermined criterion;
determining a first metering value for the scene based at least in part on a weighted average of each created exposure metering region;
setting a first exposure parameter for the image sensor based at least in part on the determined first metering value;
exposing the scene based at least in part on the set first exposure parameter;
moving a first one of the created exposure metering regions over a detected face towards a new location of the detected face in the scene;
determining a second metering value for the scene based at least in part on the new location of the first one of the created exposure metering regions;
setting a second exposure parameter for the image sensor based at least in part on the determined second metering value; and
exposing the scene based at least in part on the set second exposure parameter.

2. The dynamic auto exposure system of claim 1, wherein the predetermined criterion comprises one or more of: a minimum face size, a minimum duration of a face in the scene, a minimum number of facial features, and whether a face is recognized.

3. The dynamic auto exposure system of claim 1, wherein the first exposure parameter comprises one or more of: exposure time, gain, flash duration, and f-number.

4. The dynamic auto exposure system of claim 1, further comprising instructions in the memory for causing the programmable control device to remove an exposure metering region over a detected face when the detected face no longer meets the predetermined criterion.

5. The dynamic auto exposure system of claim 1, further comprising instructions in the memory for causing the programmable control device to remove an exposure metering region over a detected face if the detected face has been gone from the scene for a predetermined amount of time.

6. The dynamic auto exposure system of claim 1, further comprising instructions in the memory for causing the programmable control device to resize an exposure metering region over a detected face that has changed sizes.

7. The dynamic auto exposure system of claim 1, further comprising instructions in the memory for causing the programmable control device to limit the number of detected faces meeting the predetermined criterion to a maximum number of faces.

8. The dynamic auto exposure system of claim 1, further comprising instructions in the memory for causing the programmable control device to further limit the detected faces meeting the predetermined criterion to faces with a height that is at least one sixteenth of the image's height.

9. The dynamic auto exposure system of claim 1, wherein the weighted average calculation is based at least in part of the size of each of the detected faces meeting the predetermined criterion.

10. The dynamic auto exposure system of claim 1, further comprising instructions in the memory for causing the programmable control device to:
    override the creation of the exposure metering region over one or more of the detected faces meeting the predetermined criterion in response to receiving an input from a user of the system specifying a desired location for the exposure metering region; and
    create an exposure metering region over the desired location.

11. A method of dynamically auto exposing a physical scene comprising:
    receiving from an image sensor image information representative of the physical scene and comprising a plurality of pixels;
    detecting one or more faces in the image information;
    determining that one or more of the detected faces meet a predetermined criterion;
    creating an exposure metering region over the one or more detected faces meeting the predetermined criterion;
    determining a metering value for the physical scene based at least in part on a weighted average of the pixels within each created exposure metering region; and
    setting an exposure parameter for the image sensor based at least in part on the determined metering value,
    wherein the act of creating an exposure metering region over the one or more detected faces meeting the predetermined criterion further comprises moving each created exposure metering region that is over a face that has moved since the face was previously detected towards the face's current location.

12. The method of claim 11, wherein the act of creating an exposure metering region over the one or more detected faces meeting the predetermined criterion further comprises resizing each exposure metering region that is over a face that has changed in size since the face was previously detected.

13. The method of claim 11, further comprising:
    overriding the act of creating an exposure metering region over the one or more detected faces meeting the predetermined criterion in response to receiving an input from a user specifying a desired location for the exposure metering region; and
    creating an exposure metering region over the desired location.

14. A method of dynamically auto exposing a physical scene comprising:
    receiving image information representative of the physical scene and comprising a plurality of pixels from an image sensor;
    detecting one or more faces in the image information;
    determining a primary face based at least in part on a predetermined criterion;
    creating an exposure metering region over the primary face;
    determining a metering value for the scene based at least in part on the created exposure metering region;
    setting an exposure parameter for the image sensor based at least in part on the determined metering value; and
    updating the location of the exposure metering region as needed to remain over the primary face.

15. A computer usable medium having a computer readable program code embodied therein, wherein the computer readable program code is adapted to be executed to implement the method of claim 11.

16. The computer usable medium of claim 15, wherein the computer readable program code embodied therein is further adapted to be executed to resize each exposure metering region that is over a face that has changed in size since the face was previously detected.

17. The computer usable medium of claim 15, wherein the computer readable program code embodied therein is further adapted to be executed to override the act of creating an exposure metering region over the one or more detected faces meeting the predetermined criterion in response to receiving an input from a user specifying a desired location for the exposure metering region and create an exposure metering region over the desired location.

18. A computer usable medium having a computer readable program code embodied therein, wherein the computer readable program code is adapted to be executed to implement the method of claim 14.

19. The computer usable medium of claim 18, wherein the computer readable program code embodied therein is further adapted to be executed to resize the exposure metering region that is over the primary face as the size of the primary face in the scene changes.

20. The computer usable medium of claim 18, wherein the computer readable program code embodied therein is further adapted to be executed to utilize a predetermined criterion comprising one or more of: a minimum face size, a minimum duration of a face in the scene, a minimum number of facial features, and whether a face is recognized.

* * * * *